United States Patent
Amin

(10) Patent No.: US 7,003,299 B2
(45) Date of Patent: Feb. 21, 2006

(54) METHOD AND APPARATUS FOR PROVIDING PARTITIONED TELECOMMUNICATION SERVICES

(75) Inventor: Umesh J. Amin, Redmond, WA (US)

(73) Assignee: Cingular Wireless II, LLC, Atlanta, GA (US)

( * ) Notice: Subject to any disclaimer, the term of this patent is extended or adjusted under 35 U.S.C. 154(b) by 312 days.

(21) Appl. No.: 10/041,500

(22) Filed: Jan. 10, 2002

(65) Prior Publication Data

US 2002/0058516 A1    May 16, 2002

Related U.S. Application Data

(63) Continuation of application No. 08/882,804, filed on Jun. 26, 1997.

(51) Int. Cl.
*H04Q 7/00*    (2006.01)

(52) U.S. Cl. .................... 455/445; 445/428; 445/552.1

(58) Field of Classification Search ................ 455/455, 455/552, 434, 403, 412.1, 414.1, 422.1, 424, 455/426.1, 426.2, 428, 445, 432.3, 435.1–435.3, 455/450, 517, 524, 552.1, 433; 379/242–245
See application file for complete search history.

(56) References Cited

U.S. PATENT DOCUMENTS

| 5,222,128 | A | * | 6/1993 | Daly et al. ............. 379/221.04 |
| 5,371,782 | A | * | 12/1994 | Casey et al. ................ 455/465 |
| 5,473,679 | A | | 12/1995 | La Porta et al. ............ 379/201 |
| 5,524,146 | A | | 6/1996 | Morrisey et al. ........... 379/207 |
| 5,530,945 | A | | 6/1996 | Chavez, Jr. et al. .......... 379/62 |
| 5,533,027 | A | * | 7/1996 | Akerberg et al. ........... 370/247 |
| 5,555,446 | A | | 9/1996 | Jasinski ...................... 455/517 |
| 5,577,103 | A | * | 11/1996 | Foti ......................... 455/412.1 |
| 5,579,379 | A | | 11/1996 | D'Amico et al. ........... 379/112 |
| 5,583,917 | A | | 12/1996 | Jonsson ....................... 379/60 |
| 5,621,734 | A | | 4/1997 | Mann et al. ................ 370/94.1 |
| 5,657,373 | A | | 8/1997 | Hermansson et al. ....... 455/435 |
| 5,805,633 | A | | 9/1998 | Uddenfeldt .................. 375/202 |
| 5,815,810 | A | | 9/1998 | Gallant et al. .............. 455/433 |
| 5,850,445 | A | | 12/1998 | Chan et al. ................... 380/23 |
| 5,862,471 | A | | 1/1999 | Tiedemann, Jr. et al. ... 455/406 |
| 5,862,490 | A | | 1/1999 | Sasuta et al. ............... 455/525 |
| 5,878,215 | A | * | 3/1999 | Kling et al. ................ 709/207 |
| 5,881,235 | A | * | 3/1999 | Mills ......................... 709/221 |
| 5,884,157 | A | * | 3/1999 | Karmi ........................ 455/406 |
| 5,894,596 | A | * | 4/1999 | Hayes, Jr. ................... 455/418 |

(Continued)

Primary Examiner—Cong Van Tran
(74) Attorney, Agent, or Firm—Kenyon & Kenyon

(57) ABSTRACT

A wireless communication system is configured to allow for the provisioning of partitioned telecommunication service to subscribers. A wireless switch contains a partition table which associates a service provider with each wireless terminal which has the switch as its home switch. When providing telecommunication services to a subscriber using a wireless terminal, the switch provides such services using resources associated with the service provider associated with the subscriber. In one embodiment, such a resource may be a subscriber profile database such that multiple service providers maintain separate subscriber profile databases connected to the switch. The switch, upon determining the service provider associated with a subscriber requesting service, will retrieve the subscriber's profile from the subscriber database associated with the identified service provider. The switch then provides services in accordance with the retrieved profile.

16 Claims, 3 Drawing Sheets

U.S. PATENT DOCUMENTS

| | | | |
|---|---|---|---|
| 5,915,214 A * | 6/1999 | Reece et al. | 455/406 |
| 5,946,618 A * | 8/1999 | Agre et al. | 455/428 |
| 6,014,557 A * | 1/2000 | Morton et al. | 455/410 |
| 6,014,561 A * | 1/2000 | Molne | 455/419 |
| 6,038,456 A * | 3/2000 | Colby et al. | 455/456.1 |
| 6,047,176 A | 4/2000 | Sakamoto et al. | 455/422 |
| 6,064,887 A * | 5/2000 | Kallioniemi et al. | 455/445 |
| 6,078,805 A * | 6/2000 | Scott | 455/406 |
| 6,088,598 A | 7/2000 | Marsolais | 455/466 |
| 6,112,078 A * | 8/2000 | Sormunen et al. | 455/411 |
| 6,138,016 A * | 10/2000 | Kulkarni et al. | 455/433 |
| 6,212,377 B1 * | 4/2001 | Dufour et al. | 455/426.2 |
| 6,463,270 B1 * | 10/2002 | Chang et al. | 455/403 |
| 2001/0041553 A1 * | 11/2001 | Chang et al. | 455/406 |

\* cited by examiner

| | MIN | SERVICE PROVIDER |
|---|---|---|
| 306 | 206-123-XXXX | A |
| 308 | 206-345-XXXX | B |

300
302 304

402 — MSC RECEIVES REGISTRATION REQUEST FROM MS

404 — MSC DETERMINES SERVICE PROVIDER ASSOCIATED WITH MS

406 — MSC REQUESTS PROFILE INFORMATION FROM APPROPRIATE HLR

408 — MSC STORES PROFILE IN VLR

410 — PROVIDE SERVICES BASED ON PROFILE

METHOD AND APPARATUS FOR PROVIDING PARTITIONED TELECOMMUNICATION SERVICES

This application is a continuation of application Ser. No. 08/882,804 filed Jun. 26, 1997.

FIELD OF THE INVENTION

This invention relates generally to wireless communications, and more particularly to providing partitioned telecommunications services to wireless terminals.

BACKGROUND OF THE INVENTION

In any given geographic area, there is currently a small number of service providers providing wireless service in that area. Generally, each of the service providers maintains its own wireless network infrastructure to provide such services. For example, consider a geographic area which is served by two wireless service providers. Each service provider will have its own network, consisting of at least one mobile switching center (MSC) and a number of radio base stations (RBS) connected to that MSC. The MSCs and RBSs are used to provide the standard wireless communication functions in a geographic area, and the architecture and operation of MSCs and RBSs is well known for providing these functions. In addition to the MSCs and RBSs, a wireless telecommunication network will generally include other network nodes as well. These other nodes include message centers (MC) for sending text messages to messaging capable wireless terminals, voice message systems (VMS) for providing voice mail services, and home location registers (HLR) which are databases which store subscriber profile information. It is the use and configuration of these other network nodes which allow a service provider to provide additional services and functionality to its subscribers. It is the use and configuration of these other network nodes in the provisioning of wireless services which allows a service provider to differentiate itself from other service providers. Thus, a given service provider's services will have a certain "look and feel", based on the use and configuration of these other network nodes.

For example, service provider A may provide network call forwarding and voice mail services to its subscribers, whereas service provider B providing service in the same area may provide short message service, but no call forwarding or voice mail services. Thus, the "look and feel" of wireless service experienced by subscribers in that geographic area will be different depending on which service provider is providing service.

Currently, there exist service providers which do not maintain their own network, but resell the network services of other service providers. These resellers must accept the network configuration of the service provider from which they are reselling. In such a case, subscribers of both the network owner and the reseller will experience the same wireless network features and services. Similarly, there are certain geographic markets in which two or more service providers are in a partnership and they both provide wireless services using the same network infrastructure. In such markets, the partnering service providers cannot distinguish or customize their services because they are both using the same network infrastructure to provide service to their customers.

Currently the only way for a service provider to provide customized wireless network services in a geographic area is to maintain its own network in that area. However, this is often economically impossible or impractical. This is especially true as the number of service providers in an area grows.

Thus, there is a need for a technique which allows service providers to share the basic resources of a telecommunications network infrastructure while allowing each service provider to customize the services and features provided to its subscribers.

SUMMARY OF THE INVENTION

The present invention is a method and apparatus for providing partitioned wireless telecommunication services. In accordance with the invention a wireless switch receives a service request from a wireless terminal and identifies a service provider associated with the wireless terminal. Telecommunication services are then provided to the wireless terminal using network resources associated with the identified service provider.

In accordance with additional aspects of the invention, each service provider maintains its own set of wireless network resources which are used to provide services to the service provider's customers in conjunction with shared network infrastructure. In one embodiment, a service provider may maintain its own subscriber profile database which stores the service profile for subscribers. Upon receipt of a service request from a wireless terminal, the switch performs a database lookup to the subscriber profile database associated with the service provider of the wireless terminal and thereafter provides telecommunication services to the wireless terminal in accordance with the subscriber profile.

In accordance with another aspect of the invention, the resources associated with the various service providers may be physically partitioned among service providers or they may be logically partitioned among service providers.

The principles of the present invention may be applied to systems which provide service to any type of wireless terminal, including mobile stations and fixed stations.

These and other advantages of the invention will be apparent to those of ordinary skill in the art by reference to the following detailed description and the accompanying drawings.

DETAILED DESCRIPTION

Figure 1:
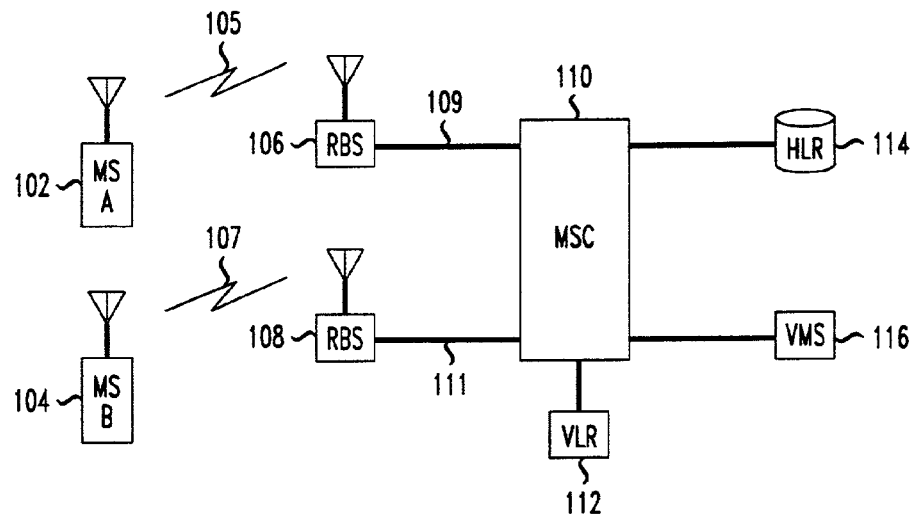
FIG. 1 shows the components of a prior art wireless network.

FIG. 1 shows some of the components of a prior art wireless network. Assume that the network shown in FIG. 1 is a partnership network such that it is owned and maintained by two service providers, service provider A and service provider B. Service provider A provides service to the subscriber using mobile station 102, and service provider B provides service to the subscriber using mobile station 104.

Assume also that both mobile station 102 and mobile station 104 are in their home system. That is, both mobile station 102 and mobile station 104 are being provided with service by their own service providers in their home geographic area. Thus, neither mobile station 102 nor mobile station 104 are roaming. A mobile station is roaming when it is operating in a geographic area outside of its home geographic area. The concepts of mobile station roaming and home geographic areas are well known in the art of wireless communications and will not be described in further detail herein.

The wireless network of FIG. 1 includes MSC 110 and RBSs 106 and 108 which are connected to, and controlled by, MSC 110. The MSC 110 and RBSs 106 and 108 are the basic components of a wireless communication network and they provide the basic connectivity functions required for wireless communications. Thus, mobile station 102 communicates with RBS 106 via air interface 105 and mobile station 104 communicates with RBS 108 via air interface 107. In turn, RBS 106 and RBS 108 communicate with MSC 110 via links 109 and 111 respectively. MSC 110 is also connected to other networks, such as the public switched telephone network (PSTN) (not shown) or other communication networks (not shown). This allows the mobile stations to communicate with each other, or with other communication devices in other networks.

MSC 110 is also connected to a home location register (HLR) 114, a visitor location register (VLR) 112, and a voice mail system (VMS) 116. The HLR 114 stores the subscriber profiles for all subscribers which have as their home switch MSC 110. As is well known in the art of wireless communications, when a mobile station attempts to register with an MSC, the MSC performs a database lookup to an HLR to retrieve the subscriber profile information, and that subscriber profile information is stored in a VLR while that subscriber is registered with the system. For example, when mobile station 102 attempts to register with MSC 110, it sends its electronic serial number (ESN), mobile identification number (MIN), and a registration request to MSC 110. Based on this information, MSC 110 performs a database lookup to HLR 114 to retrieve the subscriber profile information associated with mobile station 102 and stores the retrieved subscriber profile information in VLR 112 while mobile station 102 is registered in the geographic area served by MSC 110. Similarly, when mobile station 104 attempts to register with MSC 110, it sends its electronic serial number (ESN), mobile identification number (MIN), and a registration request to MSC 110. Based on this information, MSC 110 performs a database lookup to HLR 114 to retrieve the subscriber profile information associated with mobile station 104 and stores the retrieved subscriber profile information in VLR 112 while mobile station 104 is registered in the geographic area served by MSC 110. Mobile stations 102 and 104 will then be provided with wireless service in accordance with the profile information stored in VLR 112. If voice mail services are required by either mobile station 102 or 104, such service will be provided by VMS 116.

Thus, although mobile station 102 and mobile station 104 are subscribers of different service providers, both profiles are stored in a single HLR 114 and both subscribers are provided with the same features and network services (e.g. voice mail services by VMS 116). Since both service provider A and service provider B share the same network nodes (e.g. HLR 114 and VMS 116) the service provided to their subscribers looks the same.

Figure 2:
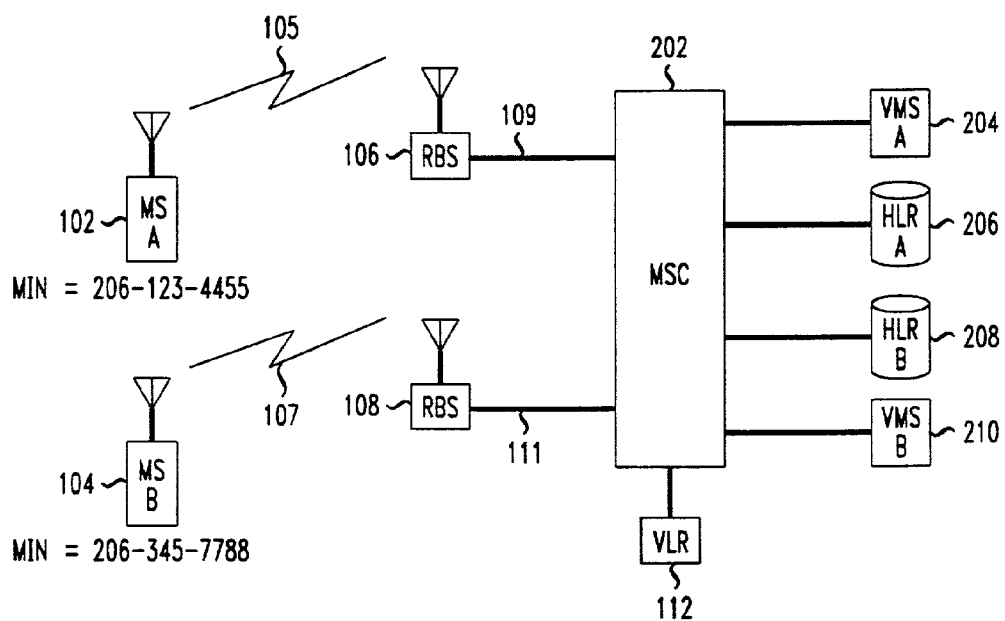
FIG. 2 shows the components of a wireless telecommunications network in accordance with one embodiment of the present invention.

FIG. 2 shows the components of a wireless telecommunications network in accordance with one embodiment of the present invention. Elements of FIG. 2 which are the same as elements of FIG. 1 have the same numbers and perform the same functions. Thus, in FIG. 2, mobile station 102 is provided with service by service provider A while mobile station 104 is provided with service by service provider B. However, in accordance with the present invention, each service provider can provide its subscribers with customized services and features even though the two service providers share the same basic wireless infrastructure nodes (e.g. RBSs 106,108, MSC 202, and VLR 112).

In accordance with the invention, MSC 202 is logically partitioned so as to provide differentiated service to mobile stations 102 and 104. As is well known, MSC 202 is an intelligent switch which operates in accordance with computer program instructions stored in a memory of the MSC 202. These stored program instructions control the operation of the MSC 202, including the switching functions, as well as other functions of the MSC 202. Thus, MSC 202 is configured to operate in accordance with the present invention by appropriate computer program instructions and data being stored in memory of the MSC 202. Such programming could be implemented by one of ordinary skill in the art given the present disclosure.

Figures 3, 4:
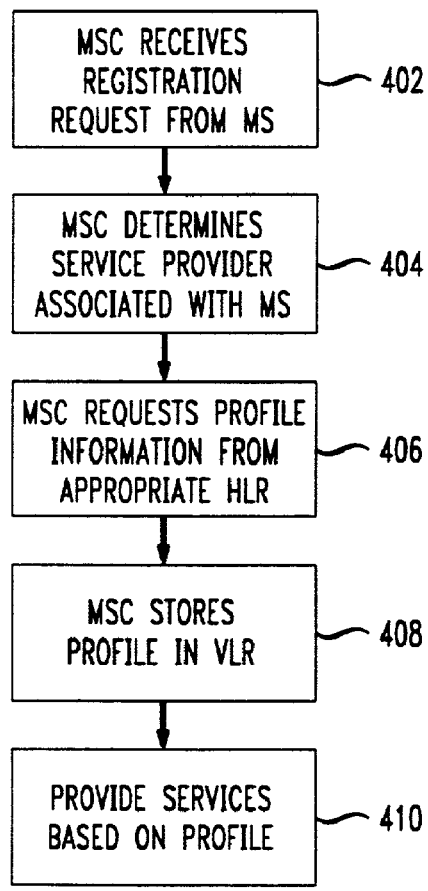
FIG. 3 shows the contents of an exemplary partition table.
FIG. 4 is a flow diagram showing the steps performed by the MSC when a mobile station attempts to register.

In order to provide partitioned service in accordance with the invention, the MSC 202 is provided with a partition table stored in memory of MSC 202. Contents of an exemplary partition table 300 are shown in FIG. 3. Partition table 300 contains two columns, MIN 302 and Service Provider 304. Thus, this table associates a service provider with a MIN for all mobile stations which have MSC 202 assigned as their home switch. For example, record 306 of partitioning table 300 indicates that all mobile stations which have a MIN with the first six digits being 206-123 are provided service by service provider A. Thus, service provider A provides service to mobile stations with a MIN in the range of 206-123-0000 through 206-123-9999. Similarly, record 308 indicates that all mobile stations which have a MIN with the first six digits being 206-345 (e.g. in the range of 206-345-0000 through 206-345-9999) are provided service by service provider B. Of course, the partition table 300 may be set up at any level of granularity. In the illustrative partition table 300 shown in FIG. 3, each service provider is associated with a range of MINs. In such a situation, MINs would be assigned to mobile stations depending on the service provider. In a similar manner, a partition table could contain a record for each mobile station which has MSC 202 as its home MSC, and each MIN would be individually associated with a service provider. Of course, any combination of individual MIN records and range MIN records could also be used. This partition table 300 is stored in MSC 202 and is used by the MSC 202 to provide partitioned service within a geographic area as follows.

A flow diagram showing the steps performed by MSC 202 when a mobile station attempts to register with the system are shown in FIG. 4. As described above, these steps are performed by the MSC 202 under control of computer program instructions. For purposes of illustration, suppose mobile station 102 powers up in the geographic service area served by MSC 202. In step 402 MSC 202 receives a registration request, including MIN (206-123-4455) and ESN from the MS 102. In step 404 the MSC 202 determines the service provider associated with mobile station 102 (e.g. the service provider which provides service to mobile station 102) by performing a table lookup to the partition table 300. MSC recognizes that the MIN of mobile station A falls within the range of MINs indicated by record 306 of partition table 300, and therefore that mobile station 102 is provided service by service provider A.

Referring again to FIG. 2, in accordance with one embodiment of the present invention, the wireless telecommunications network is provided with two sets of resources, with each set being associated with one of the service providers. In this way, each service provider maintains its own set of resources and can provide service to its subscribers using its own set of resources. For example, as shown in FIG. 2, the wireless communications network contains two independent HLRs, HLR A 206 and HLR B 208. Service provider A provides and maintains HLR A 206 and service provider B provides and maintains HLR B 208. In this way, each service provider can independently maintain the subscriber profiles for its own subscribers. Similarly, the wireless telecommunications network also contains two separate voice message systems, VMS A 204 which is provided and maintained by service provider A, and VMS B 210 which is provided and maintained by service provider B.

Returning now to the flowchart of FIG. 4, in step 406 MSC 202 performs a database lookup to HLR A 206 to retrieve the subscriber profile information for the subscriber associated with registering mobile station 102. The MSC 202 knows to access HLR A 206, and not HLR B 208, because in step 404 it determined that service provider A is the service provider for registering mobile station 102. When the subscriber profile information is retrieved from HLR A 206 it is stored in VLR 112. Thereafter, as illustrated in step 410, telecommunication services are provided to the mobile station 102 in accordance with the subscriber profile information stored in VLR 112.

As an example of the provisioning of telecommunication services, consider an incoming call to mobile station 104, which is provided with service from service provider B. Assume that mobile station 104 is not registered with the MSC 202. An incoming call to mobile station 104 is routed to MSC 202. MSC 202 determines that mobile station 104 is not registered with the system because there is no subscriber profile for mobile station 104 stored in VLR 112. MSC 202 accesses partition table 300 and determines from record 308 that mobile station 104 is associated with service provider B. MSC 202 then accesses HLR B 208 to get information from the subscriber profile of mobile station 104 regarding how to handle incomplete incoming calls to that mobile station. Assume that the subscriber profile stored in HLR B 208 for mobile station 104 indicates that incomplete incoming calls are to be routed to voice mail. Since MSC 202 knows that mobile station 104 is associated with service provider B, MSC 202 routes the incoming call for further handling to VMS B 210, which is the VMS node associated with service provider B.

Figure 5:
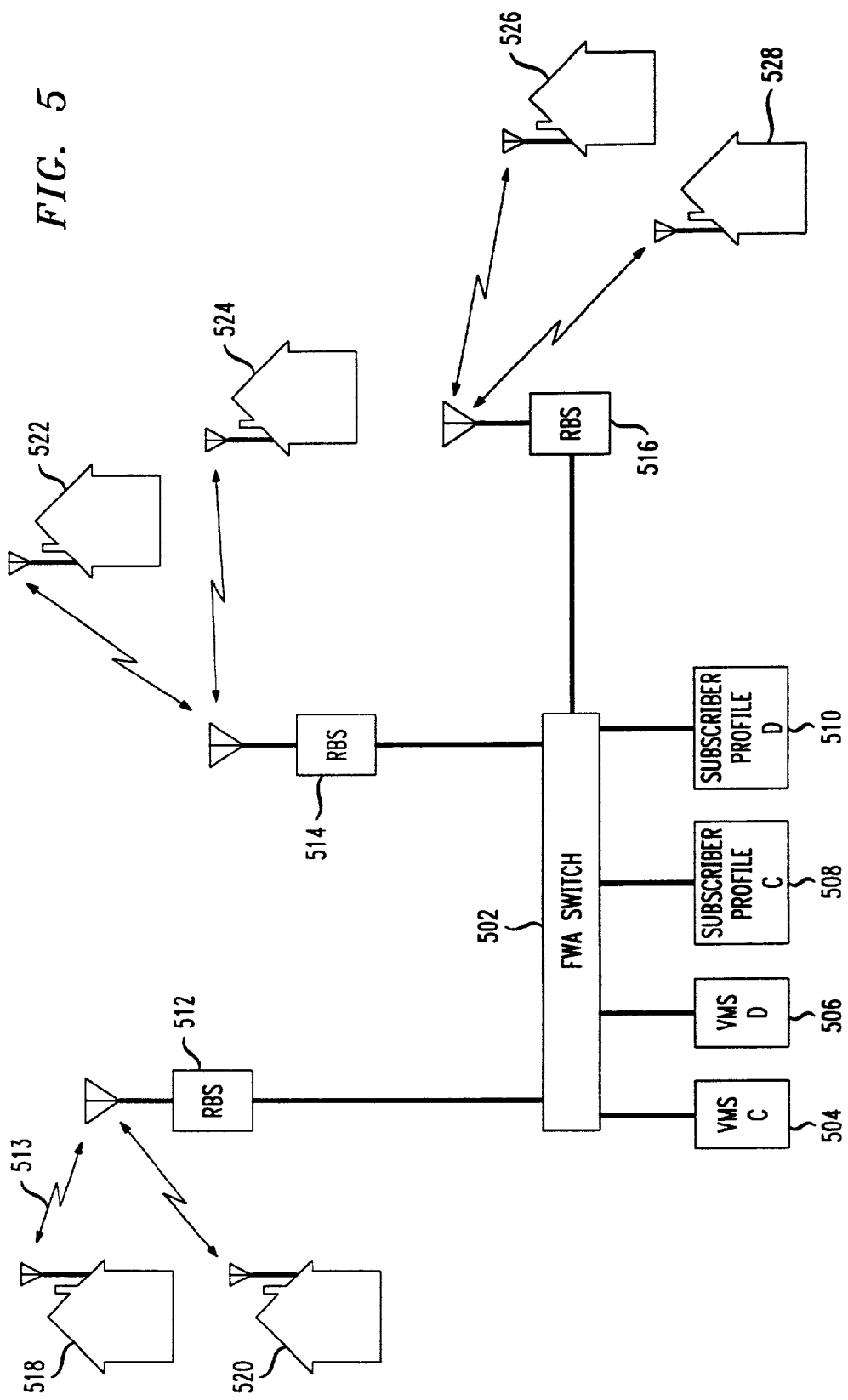
FIG. 5 shows a fixed wireless embodiment of the present invention.

FIG. 2 shows the configuration of the present invention in accordance with mobile wireless implementation in which mobile stations were provided with cellular wireless service. However, the invention is not limited to a mobile wireless implementation, but instead the principles of the present invention may be applied to any type of wireless terminal. FIG. 2 shows mobile stations 102 and 104 as one type of wireless terminal. In accordance with another embodiment of the present invention, the aspects of the invention can be implemented in a fixed wireless environment, in which the wireless terminals are fixed stations, for example residential structures. A fixed wireless embodiment of the present invention is shown in FIG. 5. The fixed wireless network of FIG. 5 contains a fixed wireless access (FWA) switch 502 connected to RBSs 512, 514, 516. In such a configuration, FWA switch 502 performs essentially the same functions as MSC 202 and RBSs 512, 514, 516 perform essentially the same functions as RBSs 106 108. Thus, FWA switch 502 provides service to residential buildings 518, 520 via RBS 512, to residential buildings 522, 524 via RBS 514, and residential buildings 526, 528 via RBS 516. Since the residential buildings are fixed, there is no need for a VLR as in the mobile embodiment shown in FIG. 2 because the residential buildings do not move and they are therefore always registered with the FWA switch 502. By partitioning the FWA switch 502 in a manner similar to that described above in conjunction with the mobile wireless embodiment, multiple service providers may customize the service they provide to residential wireless customers.

Although the basic concept is the same, since there is no concept of registration, the FWA switch 502 functions somewhat differently than the MSC 202 of FIG. 2. For example, consider an incoming call to residence 518. The call is routed to FWA switch 502 in a conventional manner and the FWA switch 502 sends appropriate call notification signals to residence 518 via RBS 512 and air interface 513. If the call is not answered at residence 518 FWA switch 502 determines the service provider associated with residence 518. This determination is similar to that of step 404 of FIG. 4. FWA switch 502 may perform this step by accessing a table similar to that of partitioning table 300, thus associating the phone number of residence 518 with a service provider. Assume for purposes of this description that residence 518 is provided with service by service provider C. FWA switch 502 then performs a database inquiry to subscriber profile C database 508 to determine how to handle an unanswered call for residence 518. Suppose the subscriber profile for residence 518 indicates that unanswered calls are to be sent to network voice mail. Thus, upon retrieving this information from subscriber profile C 508, the FWA switch 502 will route the call to VMS C 504 which is associated with service provider C. Thus, in a manner similar to that of the mobile embodiment of FIG. 2, a fixed wireless access environment can be partitioned to allow multiple service providers to provide customized and differentiated services to subscribers while sharing the same basic network components.

As can be seen from the above description, the present invention provides a valuable advantage over prior art communication systems. The partitioning aspects of the present invention allow several service providers to share the expense of providing and maintaining the basic components of a communication network while allowing the various service providers to provide differentiated services to their customers via that shared network.

The embodiments described herein were described with illustrative sets of communication network resources, such as voice mail nodes and subscriber profile databases. However, the principles of the present invention may be applied to any set of communication resources and any number of service providers. The partitioning aspects of the present invention allow for very flexible service provisioning among any number of service providers.

Further, the principles of the present invention could also be applied to a communication network in which some of the network resources are shared among some of the service providers while others are not. For example, the service providers could all share the voice mails system nodes of the network, but could maintain separate HLRs.

Further, the invention was described above with service providers providing and maintaining certain physically separate network nodes. For example, the embodiment of FIG. 2 shows service provider A maintaining VMS A 204 and HLR A 206 which are physically partitioned from HLR B 208 and VMS B 210 maintained by service provider B. In alternate embodiments, certain network nodes may be logically partitioned between service providers. For example, there could be one physical subscriber database node, but the storage facilities within that node could be logically partitioned between the to service providers.

Further, the present invention was described with the illustrative functions of mobile station registration and incoming calls to mobile stations and residences. Of course, all types of communications services can be provided using the principles of the present invention. For example, call origination may also be provided to subscribers using the aspects of the present invention. Such other services are well known and could be provided in accordance with the principles of the present invention by those skilled in the art.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention.

I claim:

1. A method of sharing network systems among wireless telecommunication service providers, the method comprising:
   receiving, at a shared network system adapted to provide a customized network service, wherein the service is customized at least in terms of a wireless telecommunications service provider that provides the service, a network request from a wireless telecommunication switch, the network request requesting the shared network system to generate a customized telecommunication service based on a service request from a wireless terminal; and
   generating the customized telecommunication service with the shared network system, the shared network system being shared by a plurality of wireless telecommunication service providers and the wireless terminal being associated with one of the service providers.

2. The method of claim 1 wherein the generating is to enable the wireless telecommunication switch to provide the customized telecommunication service to the wireless terminal.

3. The method of claim 1 wherein the shared network system is a call forwarding system, the customized telecommunication service including a call forwarding service.

4. The method of claim 1 wherein the shared network system is a voice mail system, the customized telecommunication service including a voice mail service.

5. The method of claim 1 wherein the shared network system is a short message service system, the customized telecommunication service including a short message service.

6. The method of claim 1 wherein the customized telecommunication service for the wireless terminal was previously selected by a user of the wireless terminal.

7. A telecommunication system comprising:
   a set of shared network systems adapted to provide a customized network service, wherein the service is customized at least in terms of a wireless telecommunications service provider that provides the service,
   the shared network systems capable of communicating with a shared telecommunications switch,
   the shared network systems adapted to receive network requests from the shared telecommunications switch, the network requests requesting the shared network systems to generate customized telecommunication services based on service requests from wireless terminals,
   the shared network systems further adapted to generate the customized telecommunication services, the shared network systems being shared by a plurality of service providers and each wireless terminal being associated with one of the service providers.

8. The telecommunication system of claim 7 wherein at least one of the shared network systems is a call forwarding system, the customized telecommunications services to include a call forwarding service.

9. The telecommunication system of claim 7 wherein at least one of the shared network systems is a voice mail system, the customized telecommunication services including a voice mail service.

10. The telecommunication system of claim 7 wherein at least one of the shared network systems is a short message service system, the customized telecommunication services including a short message service.

11. A machine readable medium including stored instructions capable of being executed by a processor to:
   receive, at a shared network system adapted to provide a customized network service, wherein the service is customized at least in terms of a wireless telecommunications service provider that provides the service, a network request from a wireless telecommunication switch, the network request requesting the shared network system to generate a customized telecommunication service based on a service request from a wireless terminal; and
   generate the customized telecommunication service with the shared network system, the shared network system being shared by a plurality of wireless telecommunication service providers and the wireless terminal being associated with one of the service providers.

12. The medium of claim 11 wherein the generating is to enable the wireless telecommunication switch to provide the customized telecommunication service to the wireless terminal.

13. The medium of claim 11 wherein the shared network system is a call forwarding system, the customized telecommunication service including a call forwarding service.

14. The medium of claim 11 wherein the shared network system is a voice mail system, the customized telecommunication service including a voice mail service.

15. The medium of claim 11 wherein the shared network system is a short message service system, the customized telecommunication service including a short message service.

16. The medium of claim 11 wherein the customized telecommunication service for the wireless terminal was previously selected by a user of the wireless terminal.

* * * * *